July 22, 1969  R. H. MacKAY  3,456,598
PROOFING CABINET

Filed May 8, 1967  4 Sheets-Sheet 1

INVENTOR.
Robert H. MacKay

BY
Jeffers and Young
ATTORNEYS

July 22, 1969  R. H. MacKAY  3,456,598
PROOFING CABINET
Filed May 8, 1967  4 Sheets-Sheet 2

INVENTOR.
Robert H. MacKay

BY
Jeffers and Young
ATTORNEYS

July 22, 1969  R. H. MacKAY  3,456,598
PROOFING CABINET
Filed May 8, 1967  4 Sheets-Sheet 3
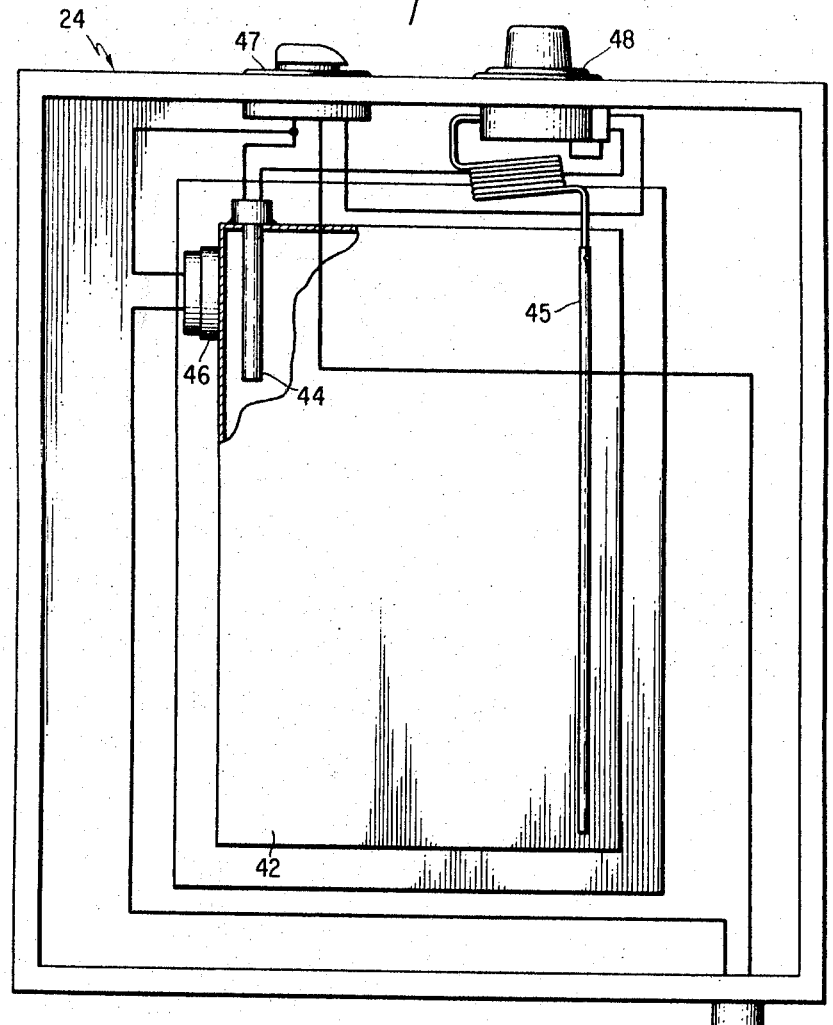
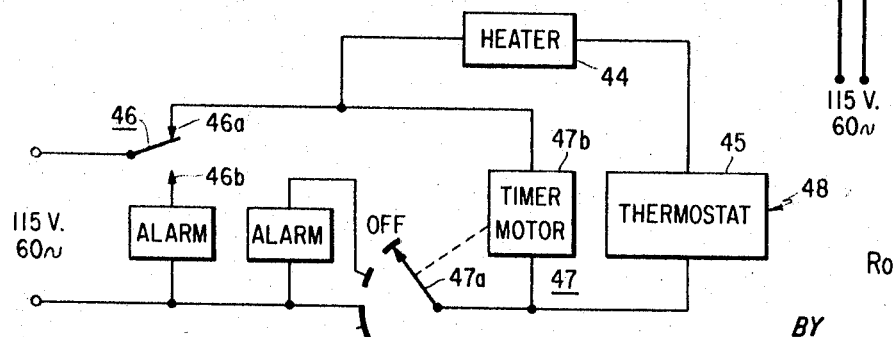
*INVENTOR.*
Robert H. MacKay
BY
*Jeffers and Young*
ATTORNEYS July 22, 1969  R. H. MacKAY  3,456,598
PROOFING CABINET
Filed May 8, 1967  4 Sheets-Sheet 4
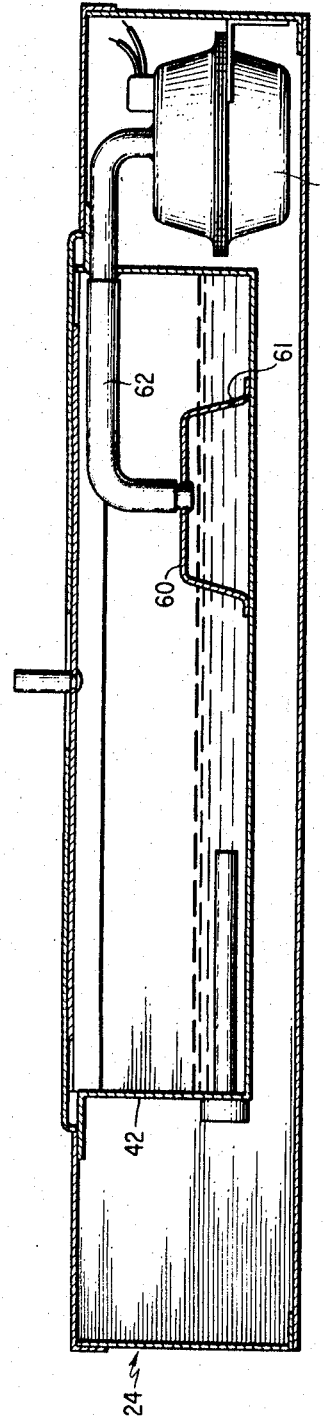
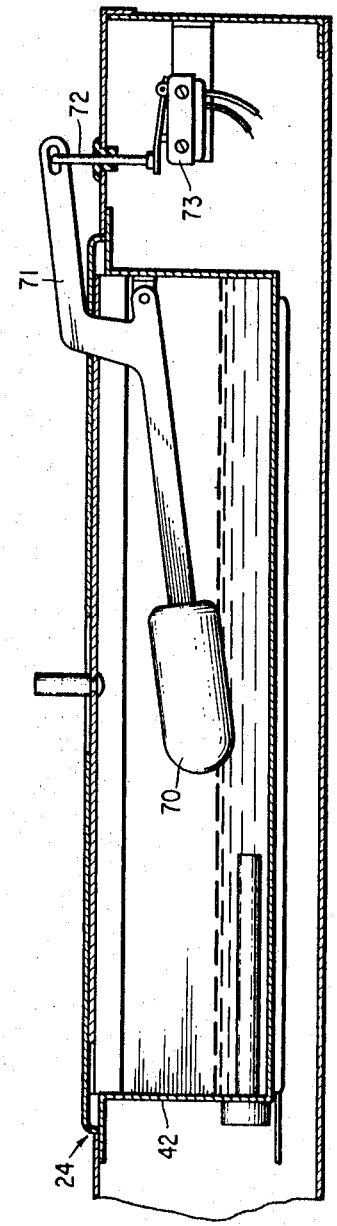
INVENTOR.
Robert H. MacKay
BY
*Jeffers and Young*
ATTORNEYS

United States Patent Office 3,456,598
Patented July 22, 1969

3,456,598
PROOFING CABINET
Robert H. MacKay, Fort Wayne, Ind., assignor to Lincoln Manufacturing Company, Inc., Fort Wayne, Ind., a corporation of Indiana
Filed May 8, 1967, Ser. No. 636,988
Int. Cl. A21c *13/00;* H05b *1/02*
U.S. Cl. 107—7                                1 Claim

ABSTRACT OF THE DISCLOSURE

An enclosed cabinet is provided with a controlled humidifier on its base and with racks along its sides to hold trays of prepared dough for rising.

Background of the invention

My invention relates to a proofing cabinet, and particularly to an improved proofing cabinet that provides a controlled moist or humid environment for rising dough.

In the preparation of breads and related bakery goods, the dough with the added yeast or rising agent must be allowed to stand for a length of time in order to rise. After the dough is mixed, it may first be allowed to rise and then be placed in its baking or cooking container. Or, the dough may first be placed in its baking or cooking container and then be allowed to rise. In either case, it is preferable that a particular dough rise under consistent and regulated humidity conditions so that the dough, after being cooked, has a consistent and uniform quality or characteristic.

Accordingly, an object of my invention is to provide an improved proofing cabinet for breads and bakery goods.

Another object of my invention is to provide an improved proofing cabinet that has a regulated or controlled humifier for rising dough.

Another object of my invention is to provide an improved proofing cabinet that has a controlled humidity which can be consistently reproduced, and that can receive a plurality of trays for holding rising dough.

Summary of the invention

Briefly, these and other objects are achieved in accordance with my invention by a cabinet having at least one door which opens to exposed tray racks along opposite interior sides of the cabinet. The racks may be adjusted in height if desired. A humidifier is mounted on the interior base of the cabinet. This humidifier has an upper plate which can move to vary the effective area of a plurality of openings. An electric heater is positioned in the container to heat and evaporate water. The evaporated water provides the desired humidity in the proofing cabinet. The electric heater is connected in an electrical circuit including a timer for controlling the period that the water is to be evaporated, a thermostat for controlling the temperature at which the water is to be evaporated, and a water level sensor that turns the heater off if the water supply falls below a predetermined level. The water level sensor may take several forms, including a heat sensitive switch, a pneumatic switch, or a float operated switch. Thus, my proofing cabinet provides an improved and well regulated humidity environment that can be consistently reproduced so that dough which rises in the environment has more uniform qualities and characteristics.

Brief description of the drawing

The subject matter which I regard as my invention is particularly pointed out and distinctly claimed in the claims. The structure and operation of my invention, together with further objects and advantages, may be better understood from the following description given in connection with the accompanying drawing, in which:

FIGURE 4 shows a bottom plan view of my humidifier, with portions broken away to show the water container;

FIGURE 5 shows one electrical circuit which can be utilized in my humidifier; and FIGURES 6 and 7 show humidifiers having two other water level sensors in accordance with my invention.

Description of the preferred embodiment

Figure 1:
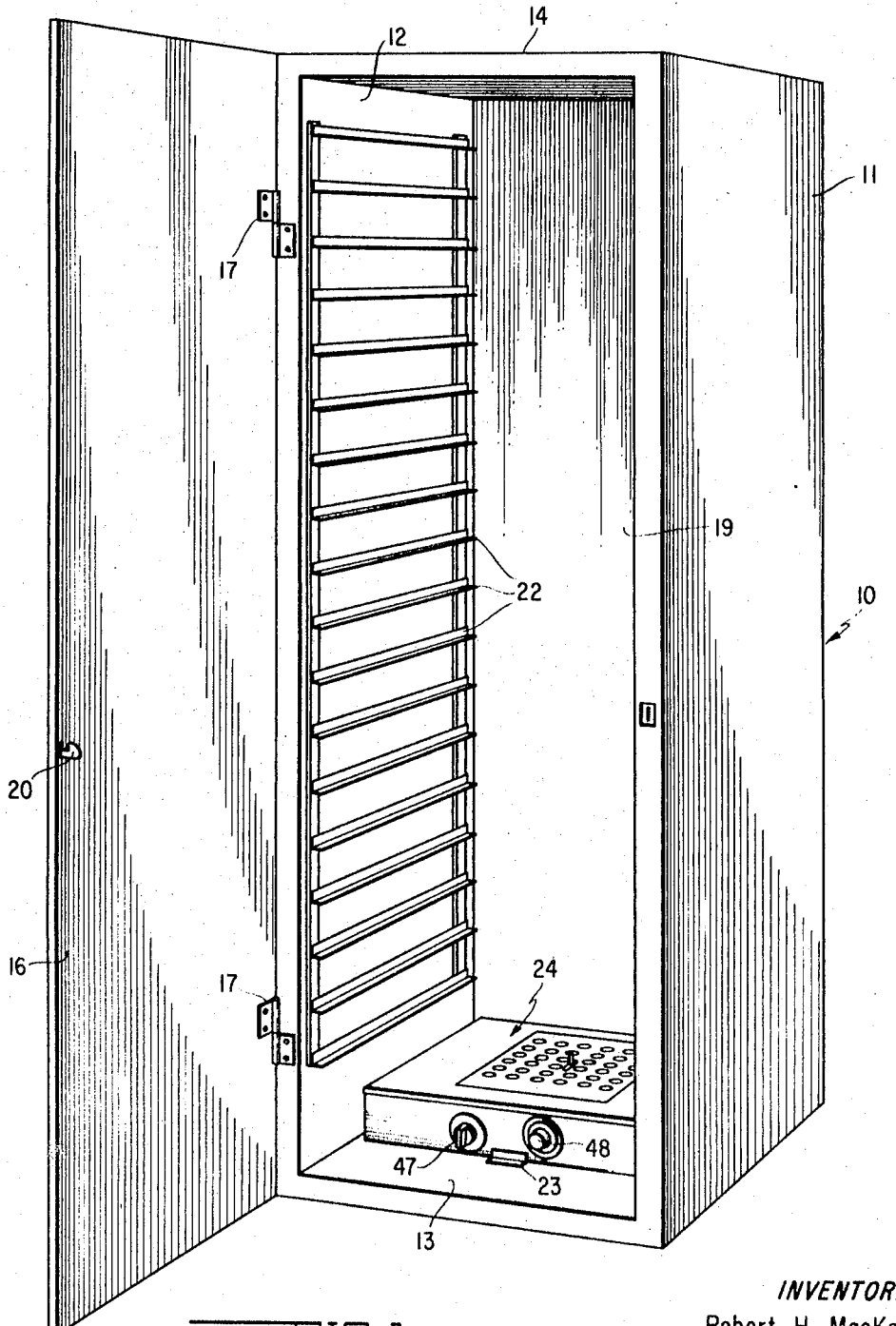
FIGURE 1 shows a perspective view of my proofing cabinet with the door in an open position.

FIGURE 1 shows a perspective view of a proofing cabinet 10 in accordance with my invention. The proofing cabinet 10 comprises two closed sides 11, 12 mounted on a base or bottom 13, and a top 14 mounted on the sides 11, 12. The cabinet 10 also comprises a front door 16 which is attached to the side 12 by hinges 17. It is preferred that the hinges 17 be of the form or structure so that the door 16 may be easily lifted off or removed. The cabinet 10 also comprises a back 19 which permits the cabinet 10 to be closed at the back. The back 19 may be a permanent part of the cabinet 10, or may be a door such as the door 16. The door 16 can be securely closed by a latch or similar structure 20. A plurality of tray racks 22 are positioned along the interior faces of the sides 11, 12. (Only the racks 22 on the side 12 are visible in FIGURE 1.) The racks 22 may have any suitable structure which provides a ledge or support for trays to be slid into and out of the cabinet 10. If desired, the racks 22 may be adjustable in height, and may be removable for cleaning. The racks 22 may also be in individual pieces, or in sections or groups of pieces. The parts making up the cabinet 10 as thus far described may be made of any suitable material such as aluminum.

Figure 2:
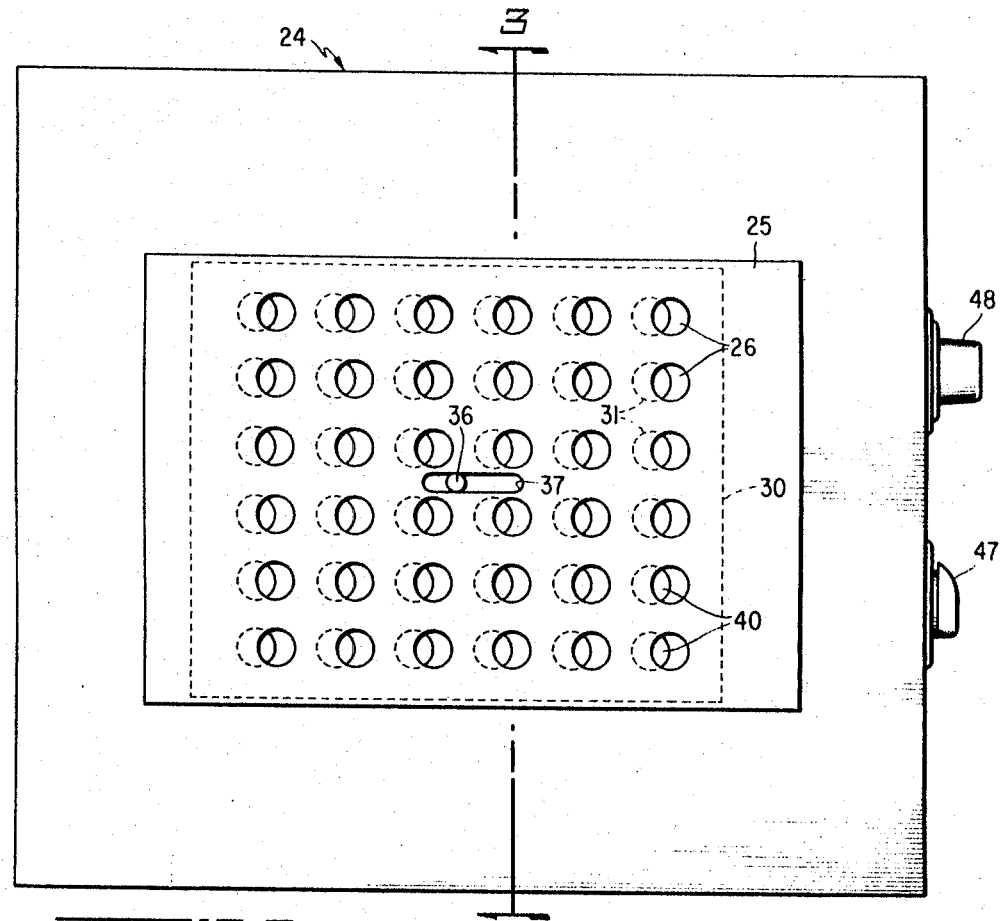
FIGURE 2 shows a top plan view of the humidifier of my proofing cabinet.
Figure 3:
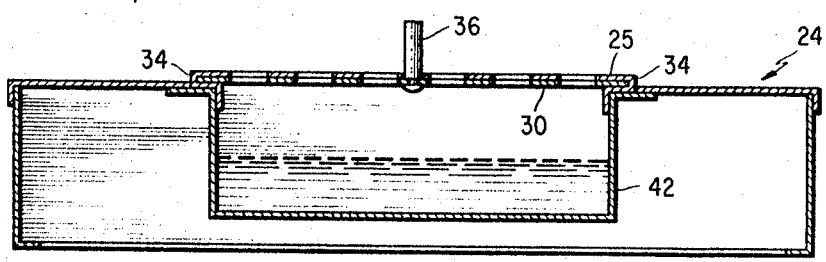
FIGURE 3 shows a cross-sectional view of the humidifier taken along the lines 3—3 in FIGURE 2.

A humidifier 24 is positioned on the base 13 of the cabinet 10 for providing the desired amount of humidity or moisture to the interior of the cabinet 10. The humidifier 24 may be held by a bracket 23 against movement, particularly during shipment of the cabinet 10. A top plan view of the humidifier 24 is shown in FIGURE 2, a cross-sectional view taken along the lines 3—3 in FIGURE 2 is shown in FIGURE 3, and a bottom plan view is shown in FIGURE 4. The humidifier 24 is a closed box-like structure formed of suitable material such as aluminum. It is preferable, but not essential, that the humidifier 24 have a relatively small vertical height in order that it not take up unnecessary space in the cabinet 10. The humidifier 24 has a fixed plate 25 positioned in its top face or surface. This fixed plate 25 is provided with a plurality of circular openings 26. A sliding plate 30 is positioned beneath the fixed plate 25, and slides in a groove or channel 34 positioned at two opposed sides of the fixed plate 25. The sliding plate 30 is arranged to slide from left to right as viewed in FIGURE 2, and into and out of the plane of the paper as viewed in FIGURE 3. The sliding plate 30 has a plurality of circular openings 31 which are preferably positioned in the same configuration as the openings 26, and which are preferably the same size and shape as the openings 26. A handle 36 is attached to the sliding plate 30 and extends upwardly from the sliding plate 30 through an elongated slot or opening 37 in the fixed plate 25. Movement of the handle 36 along the elongated opening or slot 37 moves the movable plate 30 so that the effective or common area 40 of the openings 26, 31 (that is, the area of the openings 26, 31 in register) may be varied to control the amount of moisture which passes through this effective area 40. A fixed scale may be placed beside the handle 36 so that the handle 36 can be accurately located. As shown in FIGURE 2, this effective area 40 represents about one third or one fourth of the total area of the openings 26, or the openings 31. If the movable plate 30 is moved to the right as viewed in FIGURE 2, the effective area 40 will be increased. If the movable plate 30 is moved to the left as viewed in FIGURE 2, this effective area 40 will be decreased. I prefer that the effective area 40 be variable between substantially no area (that is, the openings 26, 31 are completely offset) and an area where the openings 26, 31 are in complete register or alignment.

The humidifier 24 includes a water container or pan 42 which is shown in the cross-sectional view of FIGURE 3, and which is shown from beneath in the bottom plan view in FIGURE 4. The water container or pan 42 shown in FIGURES 3 and 4 occupies less than the full area of the humidifier 24, but it is to be understood that the water pan or container 42 may be larger or smaller. Water can be added to the pan 42 through the openings 26, 31 when they are coincident or completely aligned, or by a funnel and special opening (not shown). An electrical heater element 44 is positioned in the pan or container 42, the heater element 44 being constructed so that it provides relatively efficient transfer of heat but so that it is electrically insulated from the water in the pan or container 42. A thermostat or similar heat sensing element 45 is positioned in or beneath the pan or container 42 in order to sense the temperature of the pan 42 and the water. And, a water level sensor switch 46 is positioned on the pan 42 in the vicinity of the heater element 44. The water level sensor switch 46 is a movable, heat sensitive element (such as the bimetallic type) which occupies a first position when its temperature is below a predetermined magnitude, and which occupies a second position when its temperature is above that predetermined magnitude. The switch 46 is positioned so that if there is water in the pan 42, heat from the heating element 44 is relatively quickly dissipated into the water and the sensing switch 46 remains in its first condition. However, if the water level falls below a predetermined level, sufficient heat from the heater element 44 reaches the switch 46 and causes the switch 46 to take its second position. A timer 47 is positioned on the front of the humidifier 24, and a thermostat control 48 is also positioned on the front of the humidifier 24. The thermostat control 48 determines the temperature at which the thermostat 45 operates to open and close an electrical circuit.

FIGURE 4 show the various elements of the humidifier 24 in their relative position, and FIGURE 5 shows an electrical circuit diagram of these elements as they may be connected in a preferred embodiment of my invention. The water level sensor switch 46 has its movable element connected to one terminal of a source of suitable electrical power, such as 115 volts, 60 cycles. This power may be supplied to a male terminal at the rear of humidifier 24, to which a female terminal may be connected through an opening in the back 19 of the cabinet 10. The switch 46 has a first fixed contact 46a which the movable element engages in its first position, and has a second fixed contact 46b which the movable element engages in its second position. The fixed contact 46b is connected through an alarm to the second terminal of the source of electrical power. The contact 46a is connected to the heater 44, and the heater 44 is connected to the thermostat 45. The thermostat 45 is connected to the movable arm 47a of the timer 47, and also to a timer motor 47b. The timer 47 is known in the art. The timer motor 47b is connected to the contact 46a of the switch 46. The movable arm 47a of the timer 47 normally engages an off contact. The timer 47 also has an alarm contact and a timer contact 47c. When the arm 47a is moved to engage the timer contact 47c, it closes a circuit for the timer motor 47 which causes the movable arm 47a to move in a clockwise direction along the timer contact 47c. As shown, the timer dial may be calibrated in hours or in any suitable length or period of time. After the arm 47a leaves the timer contact 47c, it engages the alarm contact which closes a circuit from the arm 47a through the timer alarm. Thus, if the remainder of the circuit is closed and operating, an alarm will be given to indicate that the desired timing period has elapsed. The timer arm 47a may then be moved to the off contact to stop the alarm and remove power from the heater 44.

During the time that the timer 47 is operating, a circuit can be closed through the heater 44, through the intermittent opening and closing of the thermostat 45, and the arm 47a and the timer contact 47c. Thus, heat as determined by the thermostat 45, is provided by the heater 44 to the water in the pan or container 42. The thermostat 45 sets or determines this temperature of the water, and as known, it is not necessary that the water reach a temperature of 212° F. in order to be evaporated. Hence, it is desirable to have the thermostat control 48. As long as the water level in the pan or container 42 remains above the heater 44, the heat from the heater 44 is dissipated into the water. However, when the water level falls blow the heater 44, more heat is transmitted to the heat sensing or water level sensing switch 46. Eventually, this heat will cause the switch 46 to move its arm from the contact 46a to the contact 46b. This movement removes electrical power from the heater 44 and the timer 47, and closes an electrical circuit to the alarm connected to the contact 46b. This alarm can be used to indicate that the water level is low, and requires attention. Thus, the humidifier of my proofing cabinet is provided with openings which permit the amount of humidity to be controlled. The humidifier is also provided with an electrical circuit which permits the humidity to be controlled from a temperature standpoint, which permits the humidity to be supplied for a predetermined length of time, and which provides an indication or alarm when the predetermined time period has expired or when the water level becomes too low.

FIGURES 6 and 7 show additional embodiments for sensing the water level in the pan or container 42 of my humidifier 24. In FIGURE 6, the water level is sensed by a pneumatic device comprising a closed, inverted cup-shaped element 60 having an opening 61 open to the water. The interior of the element 60 is connected by a tube 62 to a diaphragm or pressure sensitive electrical switch 63. The switch 63 is arranged so that when a predetermined pressure is supplied thereto, its contacts have one position, and when less pressure is supplied thereto, its contacts have a second position. As long as the water level in the pan or container 42 is sufficiently high, this pressure is supplied through the tube 62 to the switch 63 so that it occupies the operating position that corresponds to the movable element of the switch 46 engaging the contact 46a. When the water level falls however, it will eventually reduce the pressure in the tube 62 so that the switch 63 changes its contact positions corresponding to the movable element of the switch 46 engaging the contact 46b. In this way, power is removed from the heater and an alarm may be indicated. In FIGURE 7, I use a pivoted float 70 which is connected by an arm 71 and linkage 72 to a switch 73 in such a manner that the switch 73 occupies one position when the water level is sufficiently high, and occupies a second position when the water level falls below a predetermined level. These conditions correspond to the movable element of the switch 46 engaging either the contact 46a or the contact 46b as shown in FIGURE 5. Thus, FIGURES 6 and 7 show additional means or arrangements for sensing the water level in my humidifier 24, and for removing the electrical power when the water falls below a predetermined level and if desired for giving an alarm.

It will thus be seen that my proofing cabinet provides an improved arrangement and structure for proofing or controlling the environmental conditions of dough or pastry which is rising. My proofing cabinet provides an improved closed structure that has well regulated and controlled humidity. The humidifier has controls which permit a given humidity condition to be reproduced or repeated time after time. For example, if a particular dough has been found to have the best qualities if allowed to rise in a humidity supplied by a water temperature of 200° F., with an effective opening area of 50 percent, and for a period of two hours, these conditions can be provided by setting the thermostat control 48, the handle 36, and the timer 47. And if the cabinet is used to proof a dough requiring different conditions, the particular example conditions can be repeated by placing the controls at the particular settings again. Further, my cabinet provides easy access to the interior for placing trays therein or removing trays therefrom. The rack 22 and the humidifier 24 may be removable, as is the door 16. This removable feature permits the proofing cabinet 10 to be easily and thoroughly cleaned. Persons skilled in the art will appreciate that modifications may be made. The cabinet may be made of any desirable material such as metal or plastic. The racks 22 may have various configurations and adjustable arrangements. And as described, the humidifier may have a number of level sensing devices. Further, the humidifier 24 may have openings of different configurations besides the circular configurations shown and described. Therefore, while my invention has been described with reference to a particular embodiment, it is to be understood that modifications may be made without departing from the spirit of the invention or from the scope of the claim.

What I claim as new and desire to secure by Letters Patent of the United States is:

1. A cabinet for proofing dough and the like comprising:
    (a) a horizontal base;
    (b) parallel spaced sides positioned on and extending upward from said base;
    (c) a horizontal top positioned on said sides;
    (d) a back positioned at the rear of said base, said sides, and said top, said back being fastened to said base, said sides, and said top for closing the rear of said cabinet;
    (e) a door pivotally fastened to the front of one of said sides for closing the front of said cabinet;
    (f) a plurality of tray racks mounted on the interior facing surfaces of said sides;
    (g) a humidifier positioned on said base in the interior of said cabinet, said humidifier having a container for holding a liquid to be evaporated;
    (h) a top mounted on said container, said top having a plurality of substantially similar openings positioned in rows;
    (i) a plate movably positioned adjacent to said top, said plate having a plurality of substantially similar openings positioned in rows;
    (j) said top openings and said plate openings being substantially similar to each other and being in substantially similar configurations so that movement of said plate with respect to said top permits said plate openings and said top openings to be arranged at any selected relation between complete registration and complete separation;
    (k) electrical heating means positioned in said container;
    (l) a liquid level sensing device positioned in said container, said liquid level sensing device having electrical contacts that open and close in response to selected low and high liquid levels respectively in said container;
    (m) a thermostat positioned in said container, said thermostat having electrical contacts that open and close in response to selected high and low temperatures respectively;
    (n) and means connecting said electrical heating means, said liquid level sensing device contacts, and said thermostat contacts in an electrical circuit for disabling said electrical heating means in response to the level of liquid in said container falling below a selected level and alternatively in response to the temperature of liquid in said container exceeding a selected magnitude.

References Cited

UNITED STATES PATENTS

| 499,285 | 6/1893 | Davis | 126—281 |
|---|---|---|---|
| 1,414,299 | 4/1922 | Nagel | 126—281 |
| 2,464,573 | 3/1949 | Helm | 107—7 XR |
| 3,209,125 | 9/1965 | Morrissey | 219—272 |
| 3,231,929 | 2/1966 | Hiltunen et al. | 16—171 |
| 3,323,784 | 6/1967 | Fazio | 261—142 XR |
| 3,365,567 | 1/1968 | Smith et al. | 219—272 |

FOREIGN PATENTS 470,645  1/1951  Canada.

ROBERT W. JENKINS, Primary Examiner

ARTHUR O. HENDERSON, Assistant Examiner

U.S. Cl. X.R.

126—281; 219—272, 333; 261—142